(12) United States Patent
Dutertre et al.

(10) Patent No.: US 11,363,759 B2
(45) Date of Patent: Jun. 21, 2022

(54) GUIDE MEANS, BALER AND METHOD

(71) Applicant: DEERE & COMPANY, Moline, IL (US)

(72) Inventors: Matthieu Dutertre, Chemaudin (FR); Pascal Gresset, Auxon Dessous (FR); Romain Repecaud, Arc les Gray (FR); Stephane Marchiset, Courtesoult et Gatey (FR)

(73) Assignee: Deere & Company, Moline, IL (US)

( * ) Notice: Subject to any disclaimer, the term of this patent is extended or adjusted under 35 U.S.C. 154(b) by 263 days.

(21) Appl. No.: 16/210,212

(22) Filed: Dec. 5, 2018

(65) Prior Publication Data

US 2019/0183057 A1 Jun. 20, 2019

(30) Foreign Application Priority Data

Dec. 19, 2017 (DE) .......................... 102017223285.4

(51) Int. Cl.
*A01F 15/07* (2006.01)
*A01F 15/08* (2006.01)

(52) U.S. Cl.
CPC ........ *A01F 15/0715* (2013.01); *A01F 15/085* (2013.01); *A01F 2015/074* (2013.01); *A01F 2015/077* (2013.01)

(58) Field of Classification Search
CPC ................ A01F 15/0715; A01F 15/085; A01F 2015/074; A01F 2015/077
See application file for complete search history.

(56) References Cited

U.S. PATENT DOCUMENTS

| 5,152,125 A | 10/1992 | Laver |
| 5,243,806 A | 9/1993 | Jennings et al. |
| 5,557,906 A * | 9/1996 | Viaud ................. A01F 15/0715 53/118 |

(Continued)

FOREIGN PATENT DOCUMENTS

| CN | 106233944 A | 12/2016 |
| CN | 206294563 U | 7/2017 |

(Continued)

OTHER PUBLICATIONS

Globalspec Pivot Bearings—https://www.globalspec.com/learnmore/mechanical_components/bearings_bushings/pivot_bearings#:~:text=Pivot%20bearings%20are%20frictionless%20bearings,four%20bar%20linkages (Year: 2010).*

(Continued)

*Primary Examiner* — Eyamindae C Jallow
*Assistant Examiner* — Daniel Jeremy Leeds
(74) *Attorney, Agent, or Firm* — Tucker Ellis LLP; Evan R. Sotiriou

(57) ABSTRACT

A baler for forming round bales includes a wrapping device for wrapping a pressed bale with a wrapping material, a pressing chamber where the pressed bale is formed, a guide apparatus for guiding wrapping material to the pressing chamber, and a guide means for guiding the wrapping material via a region from the wrapping device to the guide apparatus. The guide means is movable between a first position and a second position. In the first position, the guide means substantially bridges the region between the wrapping device and the guide apparatus. In the second position, the guide means at least partially opens up the region therebetween.

17 Claims, 3 Drawing Sheets

(56) References Cited

U.S. PATENT DOCUMENTS

| | | | |
|---|---|---|---|
| 6,116,002 A * | 9/2000 | Roth .................. | A01F 15/0715 100/5 |
| 6,928,792 B1 * | 8/2005 | Viesselmann ....... | A01F 15/0715 220/557 |
| 2003/0230046 A1 * | 12/2003 | Viaud ................ | A01F 15/0715 53/118 |

FOREIGN PATENT DOCUMENTS

| | | |
|---|---|---|
| DE | 4426034 A1 | 1/1996 |
| WO | WO0152629 A1 | 7/2001 |

OTHER PUBLICATIONS

German Search Report issued in counterpart application No. 102017223285.4 dated Aug. 28, 2018. (10 pages).
Chinese Office Action issued in application No. 201811366369.9 dated Jan. 29, 2022 (08 pages).

* cited by examiner

GUIDE MEANS, BALER AND METHOD

RELATED APPLICATIONS

This application claims priority to German Patent Application Ser. No. 102017223285.4, filed Dec. 19, 2017, the disclosure of which is hereby incorporated by reference in its entirety.

FIELD OF THE DISCLOSURE

The present disclosure relates to a baler for forming pressed bales, and in particular to a guide means for guiding wrapping material to a pressing chamber of the baler.

BACKGROUND

Known guide means are used on balers in order to guide wrapping material, for example, a net or a film, at the start of a wrapping process from a wrapping apparatus to a guide apparatus. The guide apparatus serves to assist the wrapping material to be conveyed from the pressed bale or the pressing means or to keep the wrapping material bearing against the pressing means. The guide means may also be used when the wrapping material has not been grasped by a pressed bale to be wrapped or has not yet been grasped by a pressing means, i.e., an endless pressing means, guiding or conveying the wrapping material to the pressing chamber of the baler or to the pressed bale.

The wrapping apparatus generally includes a wrapping material supply, such as a supply roll, from which the wrapping material is pulled off by one or more conveying rolls and is conveyed past a separating apparatus located downstream of the supply. The conventional baler is used both in the agricultural and in the industrial field. Corresponding agricultural presses serve, for example, for forming bales of harvested crops (i.e., round bales) and frequently produce at least substantially round bales of harvested crops such as straw, hay, chopped crops, etc. Industrial presses are used when compressing waste, textiles or other materials, or during the pressing thereof into bales.

These conventional guide apparatuses are generally connected directly or indirectly and substantially fixedly or immovably to the frame of the baler or the guide apparatus. In particular, in difficult harvesting conditions, such as in the case of particularly dry or damp harvested crops, in a region between the wrapping device and the guide apparatus it may result in an accumulation of material, which may prevent a conveyance of the wrapping material, or in blockages or it may lead to damage of the wrapping material.

SUMMARY

In a first embodiment of the present disclosure, a baler is provided with a wrapping device for wrapping a pressed bale with a wrapping material, comprising a guide apparatus for guiding wrapping material to a pressing chamber of the baler, and comprising a guide means which is configured in order to guide the wrapping material from the wrapping device to the guide apparatus. In this embodiment, the guide means is movably arranged such that it is able to adopt at least a first position in which it substantially bridges or spans a region between the wrapping device and the guide apparatus, and a second position in which it at least partially opens up the region between the wrapping device and the guide apparatus. In this manner, material such as harvested crops, harvested crop residue, debris, dust, etc. is able to exit the region between the wrapping device and the guide apparatus, whereby an accumulation, adhesion, deposit or an obstruction of the wrapping material or the supply of wrapping material may be prevented or counteracted. The baler may be an industrial press, for example, a press for forming pressed bales from materials such as paper, waste, textiles, etc. In particular, however, the baler is designed as an agricultural baler for forming round pressed bales. However, it is also conceivable that the baler is configured as a press for forming cuboidal or other types of bales. The baler may have a pressing chamber of a size which is both variable and invariable.

It is conceivable that in order to open up the region the guide means carries out any type of movement, for example, a translatory movement. In a particularly simple manner, however, the guide means is pivotably configured, in particular such that the guide means is able to adopt an at least substantially vertically downwardly oriented position.

Advantageously, means are provided via which the guide means is able to be movably connected to a frame of the baler or the guide apparatus. In particular, the guide means is able to be pivotably connected via these means to the frame or the guide apparatus. The means in this case are provided in or on a first end region of the guide means so that these guide means may be moved or pivoted out of the region in a simple manner between the guide apparatus and the wrapping device. To this end, the means may be configured as at least one pivot bearing or comprise such a pivot bearing.

The guide means may be designed to be of any suitable type or shape. It is particularly advantageous, however, if the guide means is configured in the manner of a guide panel or guide plate or guide grate. An end region of the guide means or of the guide plate facing the wrapping device may additionally have a free end which, in particular, is configured in the manner of a hook which is open away from the wrapping device or is flanged. This is advantageous to prevent or counteract the deposit or adhesion of material on the guide means or the free end of the guide means.

It is particularly advantageous if the guide means is able to cooperate with a separating apparatus of the wrapping device, the guide means being arranged downstream thereof.

For example, means may be provided via which the guide means are effectively operatively connected to the separating apparatus, and the region between the wrapping device and the guide apparatus, for example, may be opened up or spanned depending on an operating state of the separating apparatus. The guide means opens up the region at least when the separating apparatus adopts a position in which it cuts off the wrapping material. In this manner, material located in the region such as debris, dust, harvested crops or harvested crop residue, is able to exit the region without this influencing or preventing the actual wrapping process or the supply or conveyance of wrapping material.

The means are configured, for example, as a stop or guide element which is arranged on a carrier of the separating apparatus and bring the guide means into an operative connection with the carrier of the separating apparatus. The carrier, in particular, may be movable so as to be controllable or regulatable directly or indirectly by means of an actuator such as, for example, a hydraulic motor, an actuating motor, a lever arrangement or the like by a control or regulating apparatus of the baler. The guide means may be moved thereby together with the carrier or follow the movement thereof, wherein the movement may take place both in a rotary or translatory manner or in a combination of both types of movement.

According to a method for operating such a baler, the guide means, in particular depending on an operating state of a separating apparatus of the wrapping apparatus, adopts at least a first position in which the guide means at least substantially bridges a region between the wrapping device and the guide apparatus and a second position in which the guide means at least partially opens up the region. In this manner, in the second position during the formation of the bale or the wrapping of a pressed bale with wrapping material, material accumulated between the wrapping apparatus exits the baler and, in particular, a region between the wrapping device and the guide apparatus, whereby an accumulation or deposit of material may be counteracted or prevented. If the guide means adopts the second position, at least when the separating apparatus is moved into a position in which it cuts off the wrapping material, accumulated material or accumulating material may then exit the baler when the wrapping material is cut off by the separating apparatus from a supply or a supply roll. If the guide means adopts its first position at least at the start of a wrapping process or when the separating apparatus adopts a position in which it does not act on the wrapping material, the guide means may assist the wrapping material to pass from the wrapping device to the guide apparatus, for example, in order to be grasped at that point by a pressing means and to be conveyed in the direction of the pressing chamber or a pressed bale.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
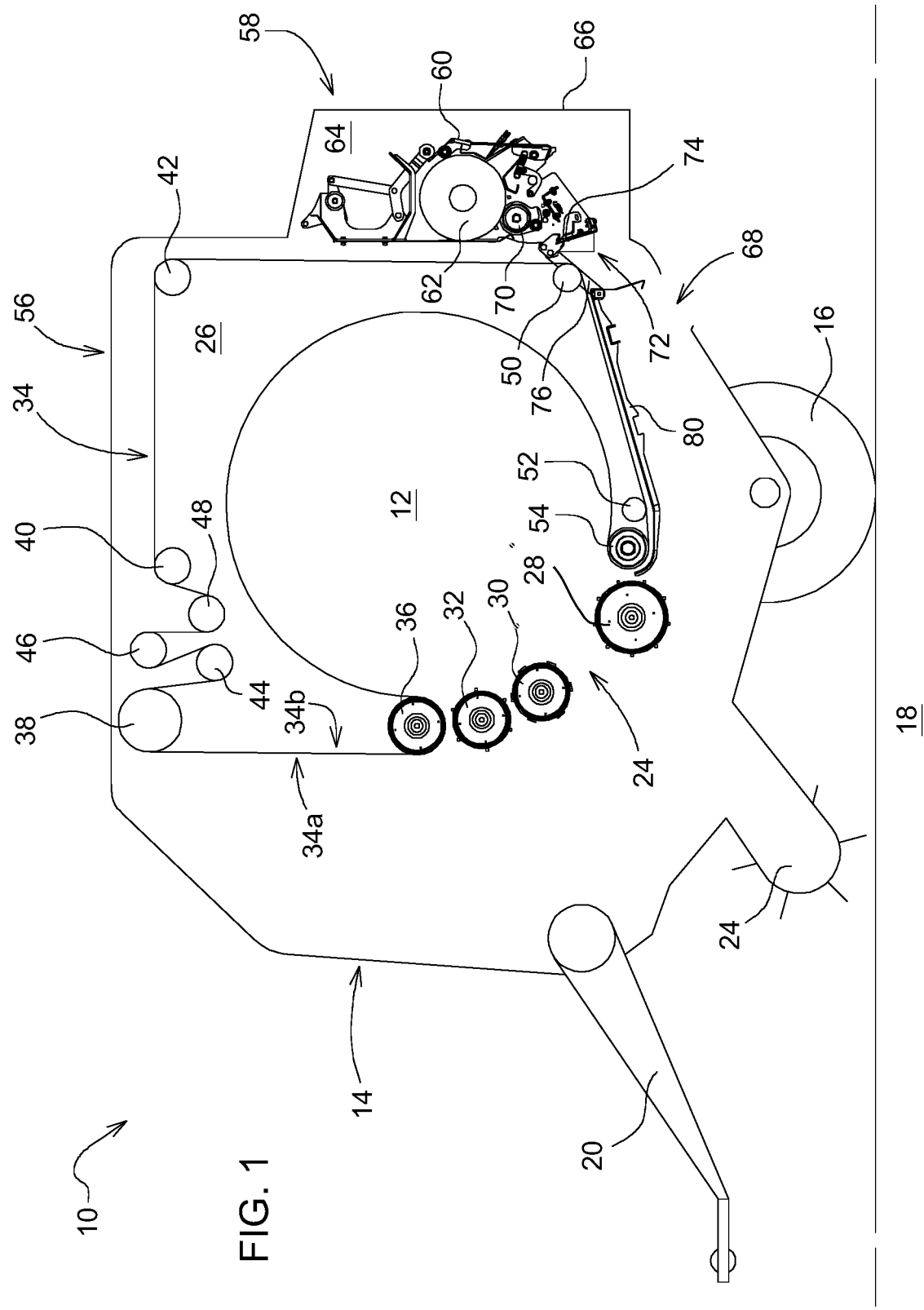
FIG. 1 is a side view of a baler with a wrapping device, a guide apparatus and a guide means.

A schematically shown baler 10, such as an agricultural round baler for pressing a round pressed bale 12, is shown in FIG. 1 of the drawings. The baler has a frame 14 which is supported by means of wheels 16 on a substrate 18 and which is able to be attached by means of a towbar 20 to a traction vehicle such as a tractor (not shown).

In a known manner, a pick-up device is located on a front lower side of the frame 14 relative to a forward direction of travel for picking up and supplying harvested crops. The pick-up device conveys cut harvested crops via an inlet 24 into a pressing chamber 26.

A lower stationary roller 28 and two upper rollers 30, 32 are positioned at the inlet 24 of the baler pressing chamber 26. The baler pressing chamber 26 is also formed by an endless pressing means 34 which according to the present embodiment is designed in the manner of pressing belts adjacent to one another and is guided around a number of fixed rollers 36, 38, 40, 42 and movable rollers 44, 46, 48, 50, 52, 54. The pressing means 34 has an outer face 34a facing the frame 14 and an inner face 34b.

While the baler pressing chamber 26 on the peripheral side is substantially surrounded by the pressing means 34 and the rollers 28, 30, 32, it is laterally defined by side walls (not shown).

Three rollers 50, 52, 54 of the movable rollers 44-54 are pivotably articulated such that they are able to be moved by means of an actuator (not shown) from the bale formation position shown in FIG. 1 into a bale ejection position pivoted to the rear and upwardly.

The pressing means 34 is fixedly applied by means of clamping means (not shown) onto the rotatably driven fixed roller 38, such that its entrainment is ensured. The roller 36 is also rotatably driven. The pressing means 34 adopts an initial state in which it bridges the inlet 24 in a stretched state and an end state in which, as shown in FIG. 1, it is wrapped around a pressed bale 12 in the manner of a large loop. The baler pressing chamber 26 is thus able to be altered in its size, i.e., its diameter increases with the size of the pressed bale 12. During its formation, the pressed bale 12 is located in the baler pressing chamber 26 and to a large extent is wrapped around by the pressing means 34 but falls to the rear onto the substrate 18 from the baler pressing chamber 26, as soon as the rollers 50-54 together with a rear housing part 56 are pivoted.

A wrapping device 58 is also provided on the rear housing part 56. The wrapping device is designed in a known manner and suitable for wrapping the pressed bale 12 with a wrapping material 60. The wrapping material 60 is rolled up on a supply roll 62, which is received in the interior 64 of a housing 66 which is attached to the rear housing part 56 and when the rear housing part 56 is closed is adjacent to a lower region 68 of the baler 12.

The wrapping device 58 has a conveying roll 70 which at least at the start of a wrapping process pulls off the wrapping material 60 from the supply roll 62. Arranged downstream of the conveying roll 70 is a separating apparatus 72 with a stationary blade 74 and a counter blade 78 received on a carrier 76. After the completion of the wrapping process the carrier 76 may be pivoted together with the counter blade 78 by means of an actuator (not shown) and also displaced or moved in a translatory manner so that the counter blade 78 comes into contact with the blade and the wrapping material 60 wrapping the pressed bale 12 may be cut off by the blade 74 from the supply roll 62.

A guide apparatus 80 is provided adjacent to the wrapping apparatus 58, in the region 68 of the baler 10 adjacent to the outer face 34a of the pressing means 34. The guide apparatus contributes to guiding the wrapping material 60 onto the bales 12 so that the wrapping material 60 is able to be grasped by the pressed bale 12 in order to wrap this pressed bale.

Figure 2A:
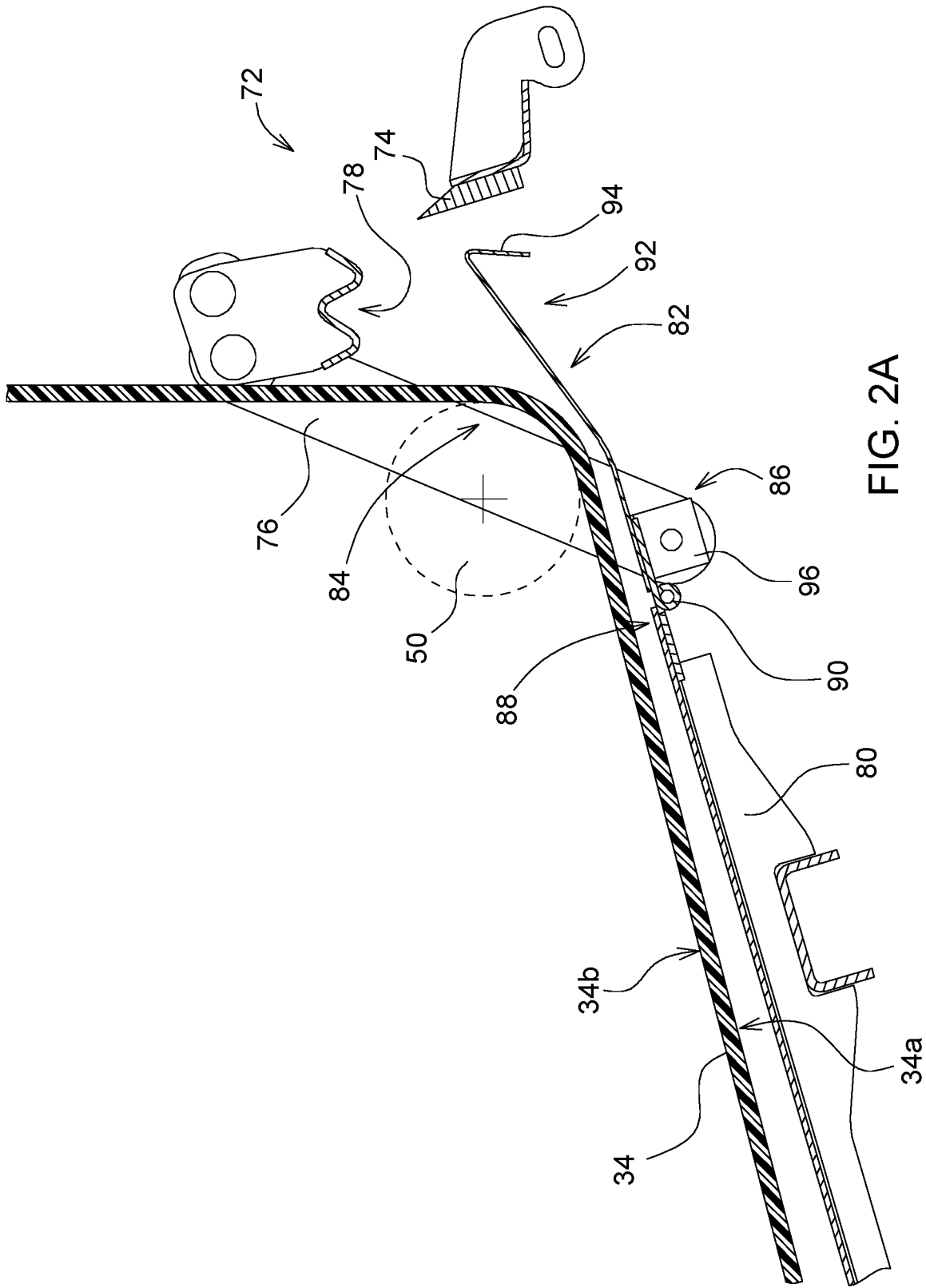
FIGS. 2a and 2b are an enlarged view of the guide means in a respective first and second position.

Reference is made to FIG. 2a of the drawings in which the separating apparatus 72 and the guide apparatus 80 are shown enlarged in detail. As already described above, the separating apparatus 72 has a stationary blade 74 and a counter blade 78. The counter blade 78 or the carrier 76 of the counter blade 78 may be moved both in a rotary and translatory manner by means of an actuator (not shown) in order to cooperate with the blade 74 such that this blade is able to cut off the wrapping material 60 from the supply roll 62 at the end or at the completion of a wrapping process in which the pressed bale 12 is wrapped with the wrapping material 60.

Moreover, a guide means 82 which spans a region 84 between the separating apparatus 72 of the wrapping device 58 and the guide apparatus 80 is provided in order to guide the wrapping material 60, in particular at the start of a wrapping process, onto the guide apparatus 80 so that this wrapping material may be grasped by the pressing means 34 in order to be guided in turn onto the pressed bale 12.

The guide means 82 may be configured, for example, as a plate, a panel, or as a grate. The guide means 82, which is configured in the present embodiment as a panel, is attached in a first end region 86 by means of a pivot bearing 88 to the guide apparatus 80 so that it may be pivoted about a pivot point 90. An end region 92 of the guide means 82 remote from the guide apparatus 80 or facing the separating apparatus 72 or the wrapping device 58 is configured to be substantially hook-like or flanged, such that its free end 94 extends away from the separating apparatus 72. In the region of the first end region 86 of the guide means 82, a stop or guide element 96 is provided on the carrier 76 such that the guide means 82 bears against the element 96, and as a result is operatively connected to the carrier 76 of the counter blade 78 such that it is pivoted, depending on the position of the counter blade 78 or the position of the carrier 76 of the counter blade 78 or the motion path thereof.

Hereinafter, the mode of operation of the guide means 82 is now intended to be shown schematically. To this end, in addition to FIG. 2a in which the guide means 82 is shown in a first position, reference to FIG. 2b of the drawings is also made in which the guide means 82 is shown in a second position.

At least during a wrapping process, the counter blade 78 adopts its position shown in FIG. 2a. The stop or guide element 96 arranged on the carrier 76 presses against the guide means 82 from below such that this guide means is held in a first position and spans or bridges the region 84 between the separating apparatus 72 and the guide apparatus 80. In this first position, the guide means 82 contributes to the wrapping material 60, which is pulled off the supply roll 62 by the conveying roll 70, reaching the guide apparatus 80 or being conveyed by the pressing means 34 or the outer face 34a thereof in the direction of the pressed bale 12 in order to be grasped thereby at that point for wrapping the pressed bale 12 with wrapping material 60.

After the wrapping of the pressed bale 12 with wrapping material 60 has been carried out or, the counter blade 76 is brought into engagement with the blade 74 by the actuator (not shown) by means of a rotation and translation of the carrier 76 so that the wrapping material 60 is cut off by the blade 74 from the supply roll 62 or from the remaining wrapping material 60 located on the supply roll 62.

Figure 2B:
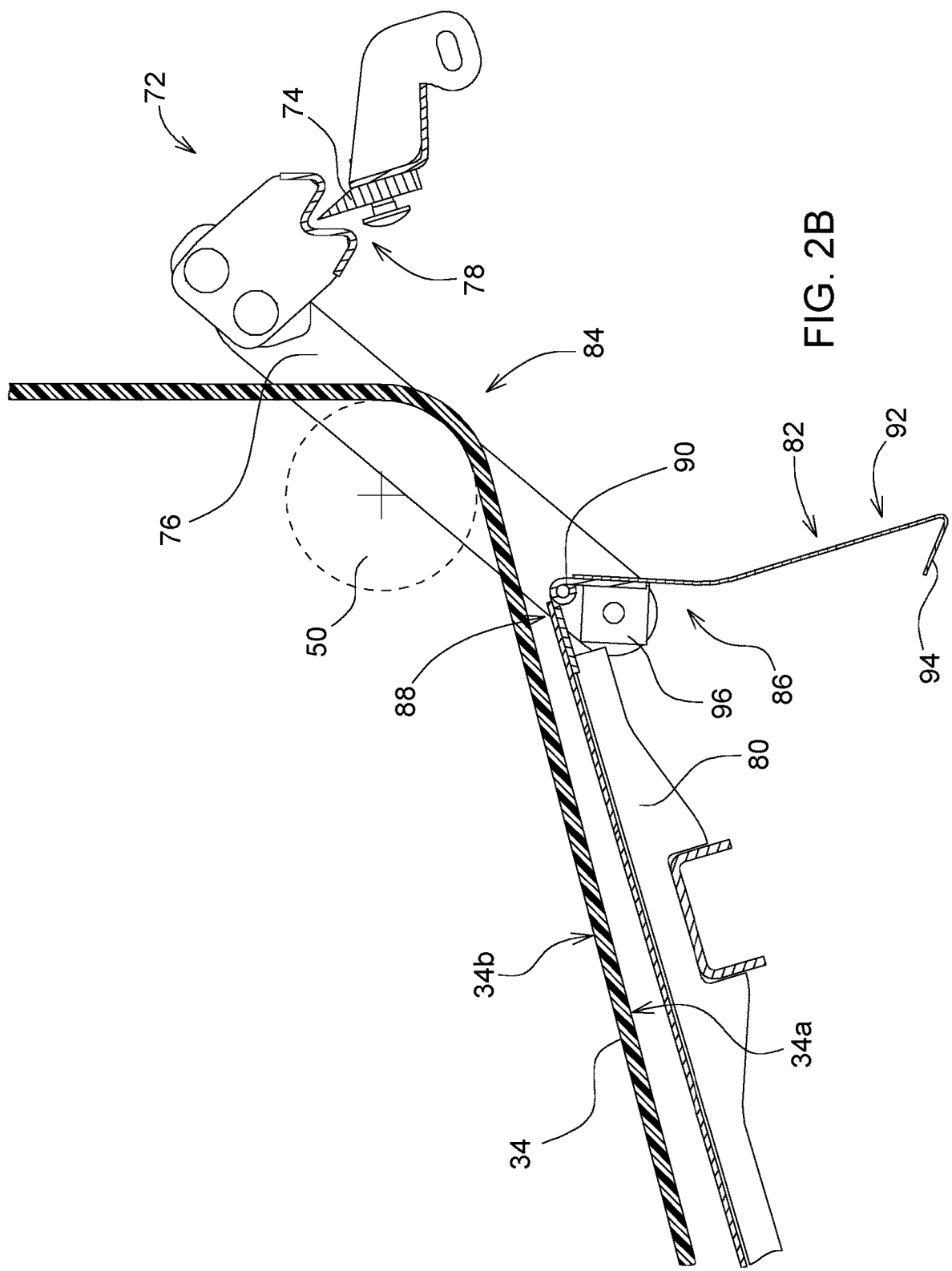

As shown in FIGS. 2a and 2b, the guide means 82 is operatively connected to the carrier 76 via the stop or guide element 96 such that by means of gravity it pivots downwardly from its first position according to FIG. 2a about the pivot point 90 into its second position according to FIG. 2b, and opens up the region 84 between the separating apparatus 72 and the guide apparatus 80. In other words, by the rotation and translation of the carrier 76 which has been initiated by the actuator, the position of the stop or guide element 96 is displaced downwardly and to the rear, such that the guide means pivots downwardly by means of gravity about the pivot point 90 and adopts a second position. In this manner, material accumulated in the region 84 or above the guide means 82, such as contaminants, harvested crops, dust, etc., exit the baler 12 whereby, for example, blockages or obstructions to a supply of wrapping material may be prevented or counteracted and thus an uninterrupted supply of wrapping material 60 may be assisted.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A baler for forming round bales, the baler comprising:
   a wrapping device for wrapping a pressed bale with a wrapping material;
   an endless pressing belt supported by a plurality of fixed rollers and a plurality of moveable rollers, the endless pressing belt defining a variable size pressing chamber where the pressed bale is formed;
   wherein the endless pressing belt includes an outer face positioned to engage the pressed bale and an opposing inner face;
   a guide apparatus fixed in position relative to the wrapping device and positioned adjacent to the outer face of the endless pressing belt for positioning the wrapping material against the outer face of the endless pressing belt and guiding the wrapping material to the variable size pressing chamber;
   wherein the guide apparatus is spaced from the wrapping device to define a region spanning between the guide apparatus and the wrapping device;
   a panel for guiding the wrapping material across the region extending between the wrapping device and the guide apparatus;
   wherein, the panel is movable relative to the wrapping device between a first position and a second position;
   wherein, in the first position, the panel substantially bridges the region between the wrapping device and the guide apparatus to guide the wrapping material from the wrapping device to the guide apparatus, and in the second position the panel pivots about a pivot point by means of gravity such that a free end of the panel remote from the guide apparatus and the pivot point moves downwardly to at least partially open up the region between the wrapping device and the guide apparatus to allow material accumulated in the region between the wrapping device and the guide apparatus to exit the baler.

2. The baler of claim 1, wherein the panel is pivotable such that in the second position the panel is disposed in a vertical position to open the region vertically below.

3. The baler of claim 1, wherein the panel is movably connected to a frame of the baler or the guide apparatus.

4. The baler of claim 3, wherein the panel is pivotably connected to the frame or the guide apparatus at the pivot point.

5. The baler of claim 3, further comprising a pivot bearing rotatably connecting the panel to the frame or guide apparatus.

6. The baler of claim 5, wherein the pivot bearing is disposed in or on a first end region of the panel.

7. The baler of claim 1, wherein the panel includes a guide plate or a guide grate.

8. The baler of claim 7, wherein the panel comprises an end region facing the wrapping device, where a free end thereof comprises a hook which is open away from the wrapping device.

9. The baler of claim 7, wherein the panel is flanged.

10. The baler of claim 1, wherein the wrapping device includes a separating apparatus having a carrier on which a stop or guide element is disposed.

11. The baler of claim 10, wherein the panel is operatively connected via the stop or guide element to the separating apparatus of the wrapping device.

12. The baler of claim 10, wherein the carrier is movably controlled by an actuator.

13. The baler of claim 12, wherein the panel is operatively connected via the stop or guide element to the separating apparatus of the wrapping device.

14. The baler of claim 13, wherein the panel is configured to open the region at least when the separating apparatus reaches a position in which it cuts off the wrapping material and the panel bridges the region when the separating apparatus reaches a position in which it does not act on the wrapping material.

15. A method for operating a baler, comprising:
providing a wrapping device, an endless pressing belt operable to define a variable size pressing chamber and supported by a plurality of fixed rollers and a plurality of moveable rollers, a guide apparatus fixed in position relative to the wrapping device and positioned adjacent to an outer face of the endless pressing belt, a separating apparatus, and a panel positioned in a region separating the guide apparatus and the wrapping device;
moving the panel to a first position based on an operating state of the separating apparatus of the wrapping apparatus, whereby in the first position the panel substantially bridges the region between the wrapping device and the guide apparatus to guide a wrapping material from the wrapping device to the guide apparatus; and
controllably moving the panel by pivoting the panel about a pivot point by means of gravity such that a free end of the panel remote from the guide apparatus and the pivot point moves downwardly to a second position to at least partially open up the region between the wrapping device and the guide apparatus to allow material accumulated in the region between the wrapping device and the guide apparatus to exit the baler.

16. The method of claim 15, further comprising moving the panel to the second position when the separating apparatus is in a position in which it cuts off the wrapping material.

17. The method of claim 15, further comprising moving the panel to the first position at the start of a wrapping process or when the separating apparatus is in a position in which it does not act on the wrapping material.

* * * * *